UNITED STATES PATENT OFFICE 2,475,920

MANUFACTURE OF PENICILLIN

Ernest Lester Smith, North Harrow, and Austin Ernest Bide, Ealing, London, England, assignors to Therapeutic Research Corporation of Great Britain Limited, London, England No Drawing. Application August 4, 1945, Serial No. 609,018. In Great Britain July 11, 1944

Section 1, Public Law 690, August 8, 1946
Patent expires July 11, 1964

7 Claims. (Cl. 195—36)

This invention is concerned with improvements in and relating to the manufacture of penicillin.

It is known that when certain molds, notably *Penicillium notatum* are grown in a suitable medium and at appropriate temperatures therapeutically active material, to which the name penicillin has been given, is found in the metabolism solution. More recently it has been recognized that this material consists of several therapeutically active organic compounds, the structural formulae of which closely resemble one another, differing from each other only in respect of the nature of a side-chain which occurs in each of them.

Thus it has already been found that the material known as penicillin occurs in different varieties in which the side-chain is $\Delta^2$-pentenyl-, benzyl-, p-hydroxy-benzyl—respectively but there is reason to suppose that other varieties of penicillin are produced by the molds, which differ from those already mentioned only in respect of the side-chain.

Penicillin was first prepared by growing *Penicillium notatum* on a "synthetic medium" comprising glucose or some other suitable source of carbon together with nutrient salts. It was found that such a medium can, under carefully controlled conditions, yield about 20 Oxford units of penicillin/ml.

Later it was found that the growth of *Penicillium notatum* on or in a medium comprising a solution containing a suitable carbohydrate or carbohydrates such as lactose or a mixture of lactose and glucose together with suitable nutrient salts and also a substantial proportion such as up to about 10% by volume of corn steep liquor can, likewise under carefully controlled conditions, yield metabolism solutions containing considerably larger amounts of penicillin, for example up to about 80 Oxford units/ml. It has however been found that there is an optimum proportion of corn steep liquor which can usefully be added to any particular medium and that a further addition beyond this point does not result in the production of more penicillin.

The use of corn steep liquor as an addition to the medium is, however attended by certain disadvantages; thus, for example corn steep liquor is of variable composition, and consequently of variable efficiency, whilst media to which the liquor has been added are usually turbid, which renders the working-up process more difficult.

The principal object of the present invention is to provide an improved process for the production of penicillin by which that substance can be produced in improved yields. We have found that the addition to the culture medium of certain substances to be hereinafter defined, enables penicillin to be produced by an improved process which does not necessitate the use of corn steep liquor, and by which the yield can be substantially increased over and above those previously obtained without such use. In some of our experiments it has been found that yields are obtained which approximate to and sometimes even exceed those previously obtained with the addition of corn steep liquor.

It is further to be noted that the present process may be applied under any of the types of culture conditions usually employed e. g., to tray, bottle, column or submerged culture.

We have found that if *Penicillium notatum* or some other penicillin-producing mold is grown in a synthetic medium to which one or more compounds of the general formula $R.C_6H_4.CH_2Y$, as defined below, have been added, the yield of penicillin is substantially increased. In the formula $R.C_6H_4.CH_2Y$, R. represents a hydrogen atom or a hydroxyl group and Y is a carboxylic acid, carboxylic acid amide, an aldehyde or an aminomethyl ($-CH_2.NH_2$) group or some other group which under the prevailing conditions of biological growth is readily convertible into one or other of these groups. The group Y should be of such a nature that the compound $$R.C_6H_4.CH_2.Y$$

is not excessively toxic to the mold. We have also found that the addition of certain other substance to be hereinafter mentioned still further increases the yield of penicillin.

It has further been found that particularly good results are obtained when the compound $R.C_6H_4CH_2.Y$ is $\beta$-phenylethylamine.

According to the invention therefore, we provide a process for the manufacture of penicillin in which *Penicillium notatum* or other penicillin producing mold is grown in a synthetic medium to which one or more substances of the general formula $R.C_6H_4.CH_2Y$ as above defined, have been added.

Compounds which, for example, have been found to be suitable for the process, according to the invention are: $\beta$-phenylethylamine, $\beta$-p-hydroxyphenylethylamine, $\beta$-phenyl-$\alpha$-alanine, phenyl pyruvic acid, phenylaceto-nitrile, C-phenylacetamidine, phenylacetyl glycine, phenylacetic acid, phenyl acetamide and phenyl acetaldehyde.

Where the substance of the stated general formula is either an acid or a base we may use such substance in the form of a suitable salt.

We have also found that the yield of penicillin obtained by the improved process can be further increased by the addition to the medium of one or more hydrolysates of one or more proteins, e. g., casein or zein.

According to a further modification of the invention, we have found that the yield of penicillin can be still further increased if, in addition to the compound or compounds of the stated general formula either with or without the addition of one or more protein hydrolysates, the medium is further supplemented by the addition of cystine and/or cysteine, or of one or more protein hydrolysates which is/are rich in either or both of these materials.

Care should of course be taken in all cases to see that the additions which according to the invention are made to the synthetic medium are neither of such a nature nor used in such a concentration, as to cause toxic effects which might impair the growth of the mold. The optimum conditions in this and other respects will be readily ascertainable by preliminary trials.

We have moreover found that the addition to a synthetic medium in which a penicillin-producing mold is to be grown of one or more compounds of the formula $R.C_6H_4.CH_2.Y$ not only increases the yield of penicillin, but tends to favor the production of that variety of penicillin which contains the side-chain represented by $R.C_6H_4CH_2—$.

The following examples, which are given only as illustrations, describe various ways in which the invention may be carried out and the results achieved by them:

Example 1

A basic medium was prepared of the following composition:

| | Grams |
|---|---|
| Lactose | 30 |
| Glucose | 10 |
| Sodium nitrate | 4 |
| Sodium citrate | 3 |
| Sodium sulphate (anhydrous) | 1 |
| Magnesium sulphate (hydrated) | 0.5 |
| Potassium dihydrogen phosphate | 2 |
| Potassium iodide | 0.0002 |
| Ferrous sulphate (hydrated) | 0.0025 |
| Cupric sulphate (hydrated) | 0.027 |
| Zinc sulphate (hydrated) | 0.021 |
| Manganese sulphate (hydrated) | 0.0002 |
| Ammonium molybdate | 0.0002 |
| Vanadium trichloride | 0.00016 |
| Boric acid | 0.0005 |
| Zein hydrolysate (hydrolyzed by autoclaving with 10 ml. concentrated hydrochloric acid and 7 ml. water for 1 hr. at 15 lbs. pressure) | 13 |
| Water to 1000 ml. | |

The solution was adjusted to pH 5.5 with caustic soda.

40 ml. quantities of this medium were autoclaved in plugged 250 ml. conical flasks, inoculated with a tested strain of *Penicillium notatum*, and incubated at 24° C. After 6 days this basic medium yielded 26 Oxford units of penicillin per ml., and after 8 days, 30 units per ml. Another portion of this medium to which 0.05 g. per 100 ml. of phenylacetamide had been added before autoclaving, yielded after 7 days 51 Oxford units of penicillin per ml., and after 8 days, 79 units per ml. Similarly, 0.05 g. per 100 ml. of the bisulphite compound of phenylacetaldehyde added in sterile solution after autoclaving the medium, raised the yield after 7 days to 83 Oxford units of penicillin per ml. Similarly, 0.25 g. per 106 ml. of phenylalanine added to the medium before autoclaving yielded after 8 days 58 Oxford units of penicillin per ml. Similarly 0.05 g. per 100 ml. of phenylpyruvic acid added to the medium before autoclaving yielded after 8 days 62 Oxford units of penicillin per ml.

Example 2

A basic medium was prepared of the following compositions:

| | Grams |
|---|---|
| Glucose | 40 |
| Sodium nitrate | 4 |
| Sodium citrate | 3 |
| Sodium sulphate (anhydrous) | 1 |
| Magnesium sulphate (hydrated) | 0.5 |
| Potassium dihydrogen phosphate | 2 |
| Potassium iodide | 0.0002 |
| Ferrous sulphate (hydrated) | 0.0025 |
| Cupric sulphate (hydrated) | 0.0045 |
| Zinc sulphate (hydrated) | 0.001 |
| Manganese sulphate (hydrated) | 0.0002 |
| Ammonium molybdate | 0.0002 |
| Vanadium trichloride | 0.00015 |
| Boric acid | 0.0005 |
| Water to 1000 ml. | |

The solution was adjusted to pH 5.5 with dilute hydrochloric acid.

200 ml. quantities of this medium were autoclaved in plugged 1000 ml. conical flasks, inoculated with *Penicillium notatum* and incubated at 24° C. After 9 days this basic medium yielded 18 Oxford units of penicillin per ml. and after 10 days 14 units per ml.

Another portion of this medium to which 1 gm. per liter of phenylacetamide had been added before autoclaving yielded 41 units of penicillin per ml. after 9 days and 48 units per ml. after 10 days.

A third portion of this medium to which 1 gm. per liter of phenylacetamide and also 0.5 gm. per liter of cystine had been added before autoclaving, yielded 57 units per ml. of penicillin after 9 days and 50 units after 10 days.

Example 3

β-phenylethylamine. A basic medium was prepared of the composition indicated in Example 1.

40 ml. quantities of this medium were autoclaved in plugged 250 ml. conical flasks, inoculated with *Penicillium notatum* and incubated at 24° C. Other flasks were similarly prepared with the same medium to which had been added 0.05% of β-phenylethylamine hydrochloride.

After 6, 7, 8, 9, and 11 days respectively control flasks on the basic medium yielded respectively 31, 50, 63, 55 and 44 Oxford units of penicillin per ml. while the flasks of the medium containing β-phenylethylamine hydrochloride yielded respectively 80, 100, 123, 110 and 128 Oxford units per ml.

It will be understood that the above examples are merely illustrative of the invention as regards to the composition of the media, the specific compounds or the quantities thereof used as additions and the specific conditions described.

We claim:

1. A process for manufacturing penicillin, which comprises, growing penicillin producing mold in a synthetic nutrient medium free from corn steep liquor and containing at least one substance selected from the group consisting of β-phenylethylamine, β-p-hydroxyphenylethylamine, β-phenyl-α-alanine, phenylacetonitrile, phenylacetyl glycine and phenyl acetamide, the amount of said substance being less than that which is toxic to the growth of the mold and not being greater than 0.25 gr. per 106 ml. of the synthetic medium.

2. A process as defined in claim 1, in which said substance is added to said nutrient medium in the form of a salt of said substance.

3. A process as defined in claim 1, in which a hydrolysate of protein is also present in the medium.

4. A process as defined in claim 1, in which a hydrolysate of casein is also present in the medium.

5. A process as defined in claim 1, in which a hydrolysate of zein is also present in the medium.

6. A process as defined in claim 1, in which cystine is also present in the medium.

7. A process as defined in claim 1, in which a protein hydrolysate rich in cystine is also present in the medium.

ERNEST LESTER SMITH.
AUSTIN ERNEST BIDE.

REFERENCES CITED

The following references are of record in the file of this patent:

UNITED STATES PATENTS

| Number | Name | Date |
|---|---|---|
| 2,423,873 | Coghill et al. | July 15, 1947 |
| 2,437,918 | McCormack | Mar. 16, 1948 |

OTHER REFERENCES

Pennsylvania State College, Penicillin Interim, Interim Report (44–82), September 3, 1944, pages 3 to 5.

Coghill, Monthly Progress Report No. 6, August 10, 1942. Distributed by Committee on Medical Research, O. S. S. R. D.—2 pages.

Coghill, as above, Report No. 16, Nov. 10, 1943. Section (C), page 2.

Coghill, as above, Report No. 20, July 5, 1944, Part II, pages 8 to 10.

Coghill, as above, Report No. 23, April 2, 1945, Part III, pages 12, 15–19.